(12) United States Patent
Petersson et al.

(10) Patent No.: US 8,994,588 B2
(45) Date of Patent: Mar. 31, 2015

(54) METHOD OF DESIGNING WEIGHT VECTORS FOR A DUAL BEAM ANTENNA WITH ORTHOGONAL POLARIZATIONS

(75) Inventors: Sven Oscar Petersson, Savedalen (SE); Bjorn Gunnar Johannisson, Kungsbacka (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 400 days.

(21) Appl. No.: 13/504,132

(22) PCT Filed: Mar. 4, 2010

(86) PCT No.: PCT/EP2010/001349
§ 371 (c)(1),
(2), (4) Date: Apr. 26, 2012

(87) PCT Pub. No.: WO2011/050866
PCT Pub. Date: May 5, 2011

(65) Prior Publication Data
US 2012/0212372 A1     Aug. 23, 2012

Related U.S. Application Data

(60) Provisional application No. 61/255,541, filed on Oct. 28, 2009.

(51) Int. Cl.
*H01Q 3/00* (2006.01)
*H04B 7/10* (2006.01)
(Continued)

(52) U.S. Cl.
CPC ............ *H01Q 3/26* (2013.01); *H01Q 21/08* (2013.01); *H04B 7/043* (2013.01); *H04B 7/0695* (2013.01); *H04B 7/10* (2013.01)
USPC ............................. 342/373; 342/368; 342/361

(58) Field of Classification Search
CPC ............ G01S 13/24; H01Q 3/40; H01Q 3/26; H04B 7/10
USPC ................... 342/81, 157, 368, 373, 374, 361; 343/756
See application file for complete search history.

(56) References Cited

U.S. PATENT DOCUMENTS

| | | |
|---|---|---|
| 5,532,706 A | 7/1996 | Reinhardt et al. |
| 6,519,478 B1 | 2/2003 | Scherzer et al. |
| 6,760,603 B1 | 7/2004 | Scherzer et al. |

(Continued)

FOREIGN PATENT DOCUMENTS

| | | |
|---|---|---|
| WO | 9843315 | 10/1998 |
| WO | 0159876 A1 | 8/2001 |
| WO | 2006071153 A1 | 7/2006 |
| WO | 2010006645 A1 | 1/2010 |

OTHER PUBLICATIONS

Office Action dated Jan. 13, 2014, issued in Chinese Patent Application No. 201080049815.9, 6 pages.

*Primary Examiner* — Dao Phan
(74) *Attorney, Agent, or Firm* — Rothwell, Figg, Ernst & Manbeck, P.C.

(57) ABSTRACT

The present invention relates to a method of generating two beams, having orthogonal polarizations, covering a selected area using an antenna (20) comprising multiple dual-polarized array elements (11). Each dual-polarized array element having a first phase center (18) associated with a first polarization and a second phase center (18) associated with a second polarization. The method comprises: designing a first weight matrix having a first non-zero weight vector for the first polarization and a second non-zero weight vector for the second polarization, calculating a second weight matrix based on the weight vectors of the first weight matrix, and applying the first and second weight matrix to the dual-polarized array elements to generate a second beam covering the selected area.

11 Claims, 3 Drawing Sheets

(51) Int. Cl.
*H01Q 3/26* (2006.01)
*H01Q 21/08* (2006.01)
*H04B 7/04* (2006.01)
*H04B 7/06* (2006.01)

(56) References Cited

U.S. PATENT DOCUMENTS

2006/0119510 A1 6/2006 Hemmi et al.
2006/0192711 A1 8/2006 Haskell

US 8,994,588 B2

METHOD OF DESIGNING WEIGHT VECTORS FOR A DUAL BEAM ANTENNA WITH ORTHOGONAL POLARIZATIONS

CROSS REFERENCE TO RELATED APPLICATIONS

This application is a 35 U.S.C. §371 National Phase Entry Application from PCT/EP2010/001349, filed Mar. 4, 2010, designating the United States and claiming priority to U.S. Provisional Application No. 61/255,541, filed Oct. 28, 2009, the disclosures of which are incorporated herein in their entirety by reference.

TECHNICAL FIELD

The present invention relates to a method of designing weight vectors for a dual beam antenna, wherein the beams have orthogonal polarizations.

BACKGROUND

Beams for sector covering transmission in mobile telephony communication systems are in case of array antennas generated by means of beamforming for transmission of user specific information. Examples of standards are TD-SCDMA and LTE-TDD, which both typically use, or will use, dual polarized antennas arranged in four columns.

The idea of combining beams, to generate a compound beam, has been disclosed, see U.S. Pat. No. 5,649,287 (reference [1]), which describes combination of beam ports from antennas having orthogonal polarizations. In [1] is disclosed the combination of beam ports associated with antennas having, not only different polarizations but also, different spatial pointing directions, to achieve a compound beam covering a larger area in an azimuth without creating nulls or near null in the combined antenna pattern.

A prior art antenna, as disclosed in FIG. 1, have two beams with orthogonal polarization covering the same area for the purpose of diversity.

The commonly used method for generating beams by means of a dual polarized array antenna is shown in FIG. 2, where each beam is generated with elements having the same polarization.

The typical problems with the common methods are:

The match between the actual and the desired beam shape is poor, since the created amplitude pattern "ripples" around the desired beam shape pattern, as illustrated in FIG. 3.

The power utilization is inefficient in the sense that the magnitude for the individual elements of the weight vector is not constant.

The weight vectors are antenna specific, i.e. they are designed for a certain element spacing and element beamwidth.

The patent publication WO2006/071153 discloses an antenna device for a radio base station in a cellular telephony system. A further patent publication WO2010/006645 discloses a base station repeater station pair.

Thus there is a need for an improved method for designing weight vectors for dual beam antennas with orthogonal polarizations.

SUMMARY OF THE INVENTION

An object with the present invention is to provide a method to achieve dual beams with orthogonal polarizations having improved antenna radiation properties in the power domain compared to prior art solutions.

This object is achieved by a method of generating two beams, having orthogonal polarizations, that both cover a selected area using an antenna having at least three dual-polarized array elements. Each dual-polarized array element has a first phase centre associated with a first polarization and a second phase centre associated with a second polarization, which is orthogonal to the first polarization. The first and second phase centres of the at least three dual-polarized array elements are arranged in a first direction and are symmetrically distributed across a two dimensional antenna surface in relation to a symmetry line, perpendicular to the first direction. Each beam is generated by feeding said multiple dual-polarized array elements, and the method comprises: designing a first weight matrix having a first non-zero weight vector for the first polarization and a second non-zero weight vector for the second polarization; applying the first weight matrix to the dual-polarized array elements to generate a first beam covering the selected area; calculating a second weight matrix based on the weight vectors of the first weight matrix; and applying the second weight matrix to the dual-polarized array elements to generate a second beam covering the selected area.

An advantage with the present invention is that a match between the actual and the desired beam shape is improved compared to prior art antennas.

Further objects and advantages may be found by a skilled person in the art from the detailed description.

BRIEF DESCRIPTION OF DRAWING

The invention will be described in connection with the following drawings that are provided as non-limited examples, in which.

DETAILED DESCRIPTION

Figure 1:
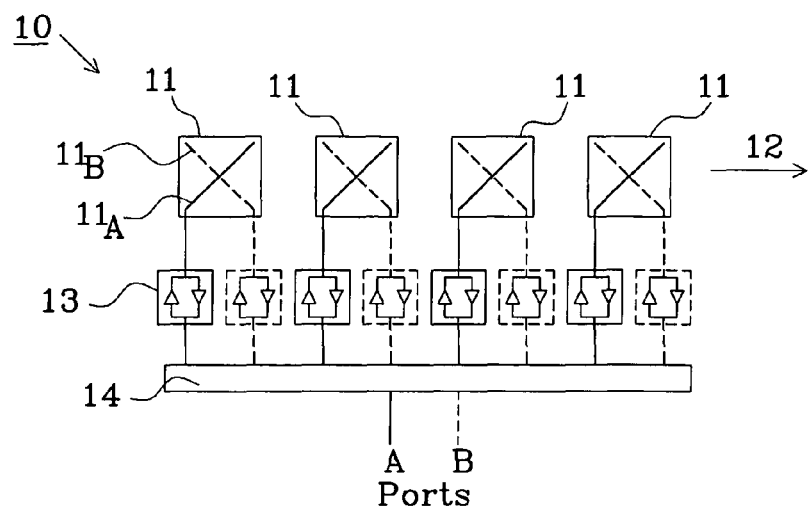
FIG. 1 shows a prior art antenna array configuration.

A prior art antenna configuration 10 is shown in FIG. 1 comprising four dual polarized elements 11 displaced with equal distance in a first direction 12. The dual polarized antenna elements 11 comprises for illustrative purposes a first element $11_A$ associated with a first polarization (solid lines) and a second element $11_B$ associated with a second polarization (dashed lines), orthogonal to the first polarization.

The antenna configuration further comprises an amplifying unit 13 coupled to each antenna element, each amplifying unit 13 comprising power amplifiers PA for downlink transmission and low noise amplifiers LNA for uplink reception as well as filters (not shown) to isolate uplink reception and downlink transmission. Antenna ports A and B are connected to the dual polarized antenna elements 11 via a beam forming network 14 and each respective amplifying unit 13. The beam forming network 14 is conventionally configured to generate two beams by connecting antenna port A and applying suitable weights to the first elements $11_A$ associated with the first polarization, and by connecting antenna port B and applying suitable weights to the second elements $11_B$ associated with the second polarization.

Figure 2:
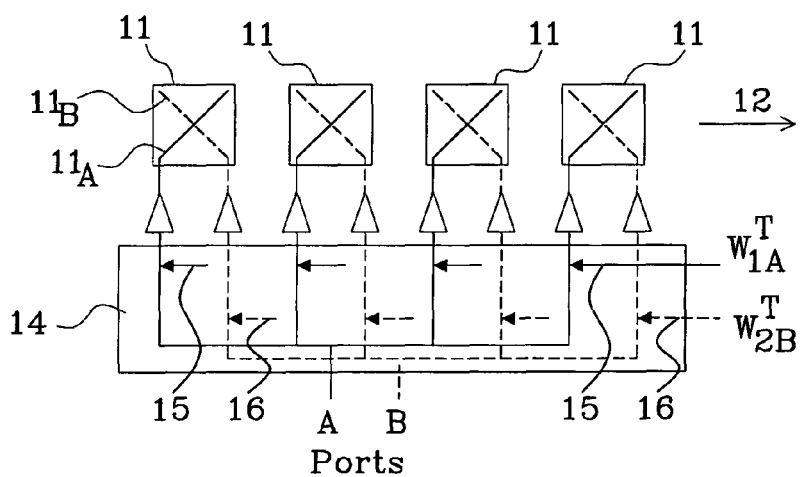
FIG. 2 shows a prior art antenna with conventional beam forming.

For purposes of diversity it is desired to have two beams with orthogonal polarization covering the same area. The commonly used method for generating beams by means of a dual polarized array antenna is shown in FIG. 2 where each beam is generated with elements having the same polarization. Observe that FIG. 2 only shows downlink and that the weights applied to each element $11_A$, and $11_B$ are illustrated by solid arrows 15 (first polarization) and dashed arrows 16 (second polarization).

Figure 3:
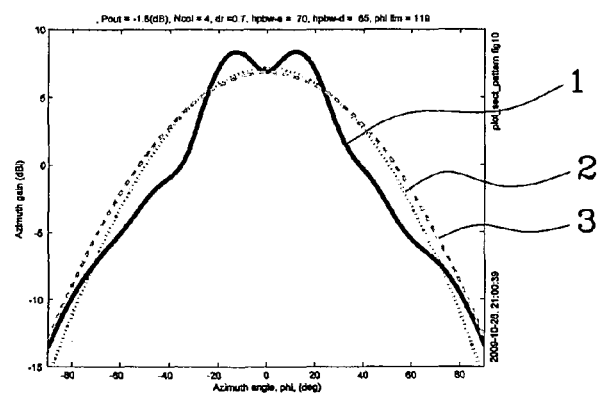
FIG. 3 shows a beam pattern for the antenna in FIG. 2.

One example of beam patterns corresponding to the common method is shown in FIG. 3. In this example the desired beam associated to port 1 is generated by applying the weight matrix $$W_1^T = \begin{bmatrix} W_{1A}^T \\ W_{1B}^T \end{bmatrix} = \begin{bmatrix} 0.3751 + j0.0363 & 1 & 1 & -0.7243 + j0.0308 \\ 0 & 0 & 0 & 0 \end{bmatrix}$$

The corresponding weight matrix for beam 2, which will have orthogonal polarization for all azimuth angles, is found as $$W_2^T = \begin{bmatrix} W_{2A}^T \\ W_{2B}^T \end{bmatrix} = \begin{bmatrix} 0 & 0 & 0 & 0 \\ 0.3751 + j0.0363 & 1 & 1 & -0.7243 + j0.0308 \end{bmatrix}$$

Two zero weight vectors, namely $W_{1B}^T$ and $W_{2A}^T$ used to achieve two orthogonal beams.

The half power beam width (hpbw) for the element is in the example set to 70 degrees and the hpbw for the desired, sector covering beam, is set to 65 deg. Element separation, i.e. the distance between the phase centres (one for each polarization) of adjacent dual polarized antenna elements 11, is set to 0.7 wavelengths.

FIG. 3 shows the beam pattern for a conventional method. Power patterns, identical for each polarization, are shown as solid line 1. Desired pattern shape, hpbw 65 deg, is shown as dotted line 2 and the element power pattern is shown as dashed line 3, hpbw 70 deg.

The amplitude taper over the elements causes the power utilization, assuming all power amplifiers have the same rated output power, to be reduced. The power efficiency figure shows the actual output power relative the total available output power when both beams are transmitting with the same average power allocation per beam. To find the efficiency figure the weight matrixes must be normalized in several steps. The first step is to set the total power equal to 1 in both beams $$W_{1,1} = \frac{W_1}{\sqrt{vec(W_1)^H * vec(W_1)}}$$

and $$W_{2,1} = \frac{W_2}{\sqrt{vec(W_2)^H * vec(W_2)}}$$

The second step is to normalize such that the maximum power, over all power amplifiers, is set to 1

$$A_{max} = \sqrt{\max(\text{diag}(vec(W_{1,1})vec(W_{1,1})^H) + \text{diag}(vec(W_{2,1})vec(W_{2,1})^H))}$$

$$W_{1,2} = \frac{W_{1,1}}{A_{max}} \text{ and } W_{2,2} = \frac{W_{2,1}}{A_{max}}$$

The third step is to calculate total output power and normalize to number of power amplifiers which corresponds to the total available output power $$\eta_{PA} = \frac{vec(W_{1,2})^H vec(W_{1,2}) + vec(W_{2,2})^H vec(W_{2,2})}{N_{PA}}$$

The vec(X) operator generates a column vector from the matrix X. The $(\ )^H$ operator takes the hermitian, i.e. the transpose of the matrix and complex conjugates all elements in the matrix.

The power efficiency for the example in FIG. 3 becomes $\eta_{PA}$=0.667 which corresponds to −1.8 dB.

The basic concept of the invention is to define weight vectors that correspond to desired antenna radiation properties in the power domain. This is achieved by having a sector beam ports connected to both polarizations of the antenna elements weighted by an appropriate weight matrix. For each single beam only the magnitude of the E-fields is of importance (power domain) and therefore considered. This is in contrast to the conventional view where the radiation properties are defined/studied for a polarization that is fixed (the same) in all directions of the corresponding beam.

The weight matrix for each beam may be divided into two weight vectors, which are non-zero weight vectors. Each weight vector has elements associated with antenna elements with the same polarization, as illustrated in more detail below.

However, when two beams shall be generated with orthogonal polarizations, the E-field for the first beam must be considered while designing the weight matrix for the second beam to ensure that polarizations become sufficiently orthogonal for all azimuth angles in the intended coverage area.

Figure 4:
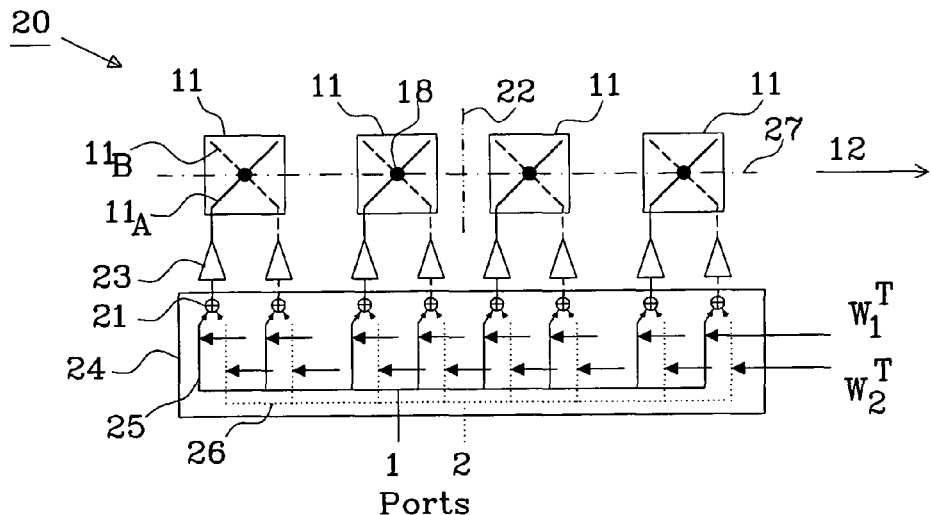
FIG. 4 shows a generic embodiment of a dual beam antenna for generation of sector covering beams according to the invention.

FIG. 4 shows a generic embodiment of a dual beam antenna 20 for generation of sector covering beams according to the invention comprising a linear antenna array with four dual polarized array elements 11, each comprising a dual-polarized antenna element, arranged in a first direction 12. The element spacing does not need to be identical but the antenna array shall be symmetrical relative a symmetry line 21 perpendicular to the first direction 12. Each dual-polarized antenna element comprises in this embodiment a first antenna element $11_A$ having a first phase centre and a second antenna element $11_B$ having a second phase centre, the first and the second phase centre coincide and are illustrated as a common phase centre 18.

An amplifying unit is connected to each antenna element $11_A$ and $11_B$, and is illustrated by a power amplifier 23 for downlink. A corresponding low noise amplifier LNA (not shown) is also connected to each antenna element for uplink. A beam forming network 24 connects each antenna ports 1 and 2 to all antenna element $11_A$ and $11_B$ via a respective power amplifiers 23 and summation unit 21, as indicated by solid 25 and dotted 26 lines. A weight matrix for each beam is applied to all antenna elements $11_A$ and $11_B$ to generate two orthogonal beams.

It should be noted that the common phase centre 18 of the dual-polarized array elements 11 are located on the straight line 27 in the first direction 12 and are symmetrical relative the symmetry line 22.

Each of the two beams is generated by means of a weight matrix $W_1^T, W_2^T$, which in this example has 8 elements arranged in two weight vectors (one weight vector per set of antenna elements with the same polarization) as illustrated below.

Figure 5:
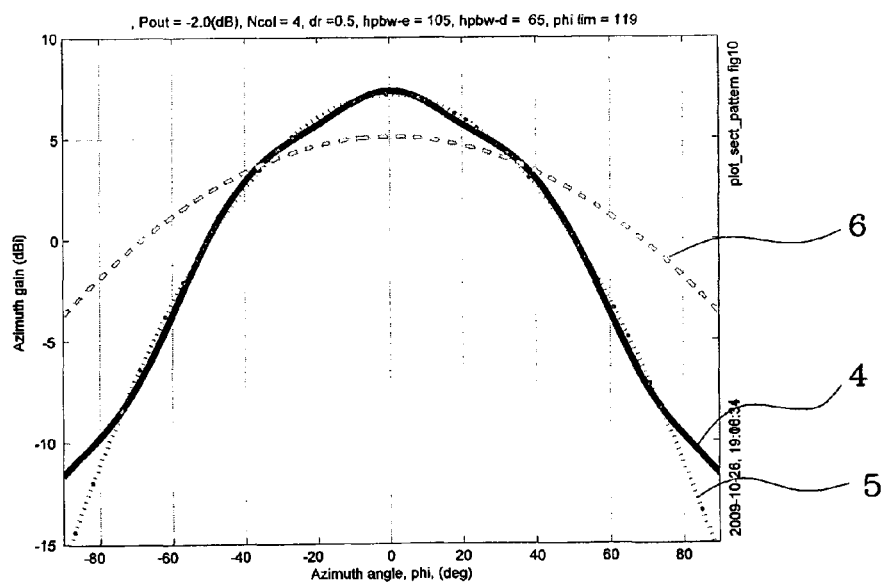
FIG. 5 shows beam patterns where dual-polarization beam forming is applied.

FIG. 5 shows beam patterns where dual-polarization beamforming is applied. The resulting power is shown by a solid line 4. The desired pattern is illustrated by a dotted line 5 and the element pattern is illustrated by dashed line 6. The beam patterns show much better correspondence with the desired pattern compared to when the conventional method is applied for similar power utilization.

The first weight matrix $W_1^T$ used for generation of beam 1 may be defined as:

$$W_1^T = \begin{bmatrix} W_{1A}^T \\ W_{1B}^T \end{bmatrix} = \begin{bmatrix} w_{11}^A & w_{12}^A & \ldots & w_{1N}^A \\ w_{11}^B & w_{12}^B & \ldots & w_{1N}^B \end{bmatrix} \quad (1)$$

"N" is the number of antenna elements having the same polarization and "A" is the first polarization and "B" is the second orthogonal polarization. $W_{1A}^T$ represents a first weight vector applied to antenna elements associated with the first polarization, and $W_{1B}^T$ represents a second weight vector applied to antenna elements associated with the second polarization. The second weight matrix $W_2^T$ used for generation of beam 2 may be similarly defined as:

$$W_2^T = \begin{bmatrix} W_{2A}^T \\ W_{2B}^T \end{bmatrix} = \begin{bmatrix} w_{21}^A & w_{22}^A & \ldots & w_{2N}^A \\ w_{21}^B & w_{22}^B & \ldots & w_{2N}^B \end{bmatrix} \quad (2)$$

Thus, each weight matrix has two weight vectors (one for each polarization) with N complex elements as illustrated in Equations (1) and (2). The second weight matrix shall generate a beam that have the same power pattern and orthogonal polarization to beam 1 in all directions, which for the uniform linear array in FIG. 4 is given as:

$$W_2^T = \begin{bmatrix} W_{2A}^T \\ W_{2B}^T \end{bmatrix} = conj\left(\begin{bmatrix} -W_{1B}^T \\ W_{1A}^T \end{bmatrix}\right) F \quad (3)$$

F is a matrix that reverses the elements in the vector it operates on.

$$F = \begin{bmatrix} 0 & 0 & \ldots & 1 \\ \vdots & \vdots & \ddots & \vdots \\ 0 & 1 & \ldots & 0 \\ 1 & 0 & \ldots & 0 \end{bmatrix} \quad (4)$$

Thus, the second weight matrix may be defined as:

$$W_2^T = \begin{bmatrix} W_{2A}^T \\ W_{2B}^T \end{bmatrix} \quad (5)$$

$$= conj\left(\begin{bmatrix} -W_{1B}^T \\ W_{1A}^T \end{bmatrix}\right) F$$

$$= conj\left(\begin{bmatrix} -w_{11}^B & -w_{12}^B & \ldots & -w_{1N}^B \\ w_{11}^A & w_{12}^A & \ldots & w_{1N}^A \end{bmatrix}\right) \begin{bmatrix} 0 & 0 & \ldots & 1 \\ \vdots & \vdots & \ddots & \vdots \\ 0 & 1 & \ldots & 0 \\ 1 & 0 & \ldots & 0 \end{bmatrix} =$$

$$= \begin{bmatrix} (-w_{1N}^B)^* & \ldots & (-w_{12}^B)^* & (-w_{11}^B)^* \\ (w_{1N}^A)^* & \ldots & (w_{12}^A)^* & (w_{11}^A)^* \end{bmatrix}$$

$$= \begin{bmatrix} w_{21}^A & w_{22}^A & \ldots & w_{2N}^A \\ w_{21}^B & w_{22}^B & \ldots & w_{2N}^B \end{bmatrix}$$

The operator $(X)^*$ is the complex conjugate of X.

The second weight matrix is calculated based on the weight vectors of the first weight matrix, and equation (3) is the mathematical expression of an operation performed on the "N" complex elements of the weight vectors of the first weight matrix to obtain the second weight matrix. In order to fully appreciate the actual operation to generate a second beam with the same power pattern as the first beam, which is essentially orthogonal to each other in all directions, the operation may be divided into three steps to be performed in arbitrary order.

Step 1

Each element of the first weight vector $W_{1A}^T$ in the first weight matrix $W_1^T$ is mirrored in the real axis (i.e. complex conjugate each element) and mirroring each element of the second weight vector $W_{1B}^T$ in the first weight matrix $W_1^T$ is mirrored in the imaginary axis (i.e. complex conjugate each element with a sign shift), as illustrated below:

$$W_{1A}^T = [w_{11}^A \, w_{12}^A \ldots w_{1N}^A] \Rightarrow [(w_{11}^A)^*(w_{12}^A)^* \ldots (w_{1N}^A)^*]$$

$$W_{1B}^T = [w_{11}^B \, w_{12}^B \ldots w_{1N}^B] \Rightarrow [(-w_{11}^B)^*(-w_{12}^B)^* \ldots (-w_{1N}^B)^*]$$

Step 2

The order of the rows is reversed, i.e. "row reversing" the calculated elements, as illustrated below:

$$\begin{bmatrix} (w_{11}^A)^* & \ldots & (w_{12}^A)^* & (w_{1N}^A)^* \\ (-w_{11}^B)^* & \ldots & (-w_{12}^B)^* & (-w_{1N}^B)^* \end{bmatrix} \Rightarrow \begin{bmatrix} (-w_{11}^B)^* & (-w_{12}^B)^* & \ldots & (-w_{1N}^B)^* \\ (w_{11}^A)^* & (w_{12}^A)^* & \ldots & (w_{1N}^A)^* \end{bmatrix}$$

Step 3

The order of the columns is reversed, i.e. "column reversing" the calculated row reversed elements to obtain the elements of the first vector $W_{2A}^T$ and the second weight vector $W_{2B}^T$ in the second weight matrix $W_2^T$ as illustrated below:

$$\begin{bmatrix} (-w_{11}^B)^* & (-w_{12}^B)^* & \ldots & (-w_{1N}^B)^* \\ (w_{11}^A)^* & (w_{12}^A)^* & \ldots & (w_{1N}^A)^* \end{bmatrix} \Rightarrow$$

$$\begin{bmatrix} (-w_{1N}^B)^* & \ldots & (-w_{12}^B)^* & (-w_{11}^B)^* \\ (w_{1N}^A)^* & \ldots & (w_{12}^A)^* & (w_{11}^A)^* \end{bmatrix} = W_2^T$$

As the applied weight vector matrix includes both polarizations it is possible to design a weight matrix that:
- gives a better match between the realized and the desired beam shapes compared to the conventional method; and/or
- gives better power utilization compared to the conventional method.

Example 1

The first weight matrix $W_1^T$ used for generation of a first beam using four dual-polarized elements as described in connection with FIGS. 4 and 5 is:

$$W_1^T = \begin{bmatrix} W_{1A}^T \\ W_{1B}^T \end{bmatrix}$$

$$= \begin{bmatrix} w_{11}^A & w_{12}^A & w_{13}^A & w_{14}^A \\ w_{11}^B & w_{12}^B & w_{13}^B & w_{14}^B \end{bmatrix}$$

$$= \begin{bmatrix} 0.5074e^{j1.7224} & 1e^{-j0.3342} & 1e^{-j0.6684} & 0.5074e^{j0.7198} \\ 0.5074e^{j0.7198} & 1e^{-j0.6684} & 1e^{-j0.3342} & 0.5074e^{j1.7224} \end{bmatrix}$$

$W_{1A}^T$ and $W_{1B}^T$ are non-zero weight vectors.

The second weight matrix $W_2^T$ for the second beam in this example is calculated using equation (3) and becomes:

$$W_2^T = \begin{bmatrix} W_{2A}^T \\ W_{2B}^T \end{bmatrix}$$

$$= \begin{bmatrix} w_{21}^A & w_{22}^A & w_{23}^A & w_{24}^A \\ w_{21}^B & w_{22}^B & w_{23}^B & w_{24}^B \end{bmatrix}$$

$$= \begin{bmatrix} 0.5074e^{j1.4192} & 1e^{-j2.8074} & 1e^{-j2.4732} & 0.5074e^{j2.4218} \\ 0.5074e^{-j0.7198} & 1e^{j0.6684} & 1e^{j0.3342} & 0.5074e^{-j1.7224} \end{bmatrix}$$

Resulting in a second weight matrix having non-zero weight vectors $W_{2A}^T$ and $W_{2B}^T$.

The half power beam width (hpbw) for the element is in the example set to 105 deg and the hpbw for the desired, sector covering beam, is set to 65 deg. Element separation, i.e. separation between the first phase centres and the second phase centres, respectively, is set to 0.5 wavelengths.

The power utilization figure for this example becomes $\eta_{PA}$=0.629 which corresponds to −2.0 dB.

As may be noted, the power utilization is lower than the power utilization for the prior art example illustrated in connection with FIG. 3, but the conditions are not the same which explains the difference.

This size of antenna is used in the following description, but the idea can be applied to other antenna sizes as well. In reality each described antenna element can also be designed as a number of separate antenna element structures (subarrays).

Figure 6:
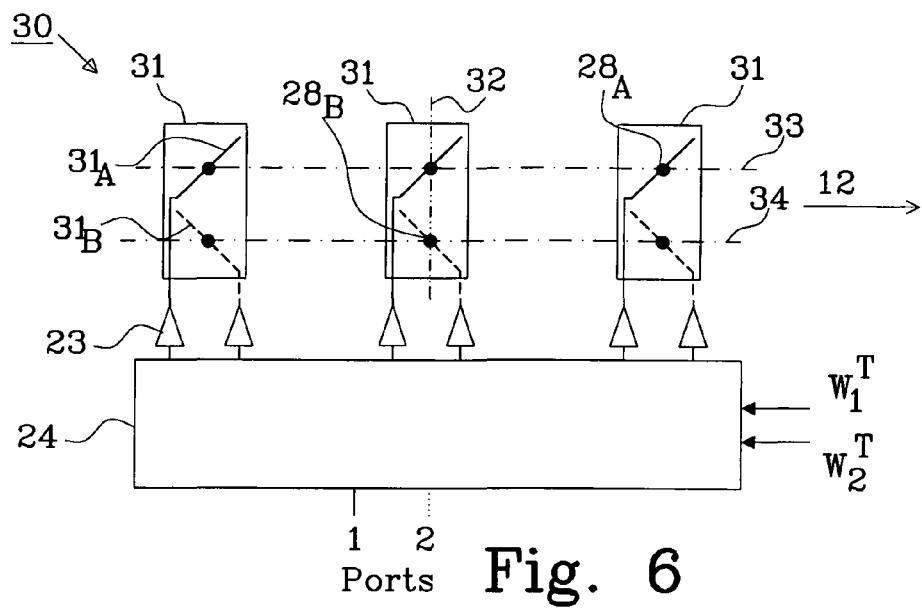
FIG. 6 shows a second embodiment of a dual beam antenna according to the invention.

FIG. 6 shows a second embodiment of an antenna 30 according to the invention comprising three dual-polarized array elements 31, each comprising a first antenna element 31$_A$ and a second antenna element 31$_B$ with orthogonal polarizations, a power amplifier 23 (only downlink is shown for clarity) and a beamforming network 24 connecting antenna ports 1 and 2 to all antenna elements 31$_A$ and 31$_B$ via the power amplifier 23 (and a corresponding LNA for uplink). The phase centre of each antenna element is illustrated as a dot, and the first phase centres 28$_A$ of the first antenna elements 31$_A$ associated with a first polarization are located on a first straight line 33 arranged in a first direction 12 and the second phase centres 28$_B$ of the second antenna elements 31$_B$ associated with a second polarization (orthogonal to the first polarization) are located on a second straight line 34 (parallel to the first line 33).

The first phase centres of the first antenna elements 31$_A$ and the second phase centres of the second antenna elements 31$_B$ are symmetrically arranged in relation to a symmetry line 32.

In this example a first weight matrix having two weight vectors, each with three elements, is provided to obtain a desired power pattern for the first beam, such as:

$$W_1^T = \begin{bmatrix} W_{1A}^T \\ W_{1B}^T \end{bmatrix} = \begin{bmatrix} w_{11}^A & w_{12}^A & w_{13}^A \\ w_{11}^B & w_{12}^B & w_{13}^B \end{bmatrix}$$

The corresponding second weight matrix to generate the second beam is:

$$W_2^T = \begin{bmatrix} W_{2A}^T \\ W_{2B}^T \end{bmatrix} = \begin{bmatrix} w_{21}^A & w_{22}^A & w_{23}^A \\ w_{21}^B & w_{22}^B & w_{23}^B \end{bmatrix} = \begin{bmatrix} (-w_{23}^B)^* & (-w_{22}^B)^* & (-w_{21}^B)^* \\ (w_{23}^A)^* & (w_{22}^A)^* & (w_{21}^A)^* \end{bmatrix}$$

The weight matrices can be modified by applying an arbitrary polarization rotation without changing the shapes of the power patterns but the polarizations will of course be changed. A polarization rotation can be applied by means of a polarization rotation matrix $\Phi$ according to $$W_{pol\_rot} = W_{no\_pol\_rot} \Phi$$

The structure for the polarization rotation matrix is $$\Phi = \begin{bmatrix} \cos(\beta) & \sin(\beta) \\ -\sin(\beta) & \cos(\beta) \end{bmatrix}$$

where $\beta$ is the spatial angle for the rotation of the polarization.

Further, the weight matrixes can be modified be means of a phase shift, equal for both matrixes (both beams), according to $$W_{phase\_offset} = We^{j\alpha}$$

where $\alpha$ is an arbitrary electrical phase angle.

In some specific cases the weight matrix, containing the two weight vectors, becomes very simple. An example is where the shape of the element pattern and the desired pattern are more or less identical.

An example of weight matrixes for this case is:

$$W_1^T = \begin{bmatrix} 1 & 1 & 0 & 0 \\ 1 & -1 & 0 & 0 \end{bmatrix} \text{ and } W_2^T = \begin{bmatrix} 0 & 0 & 1 & -1 \\ 0 & 0 & 1 & 1 \end{bmatrix}$$

Figure 7:
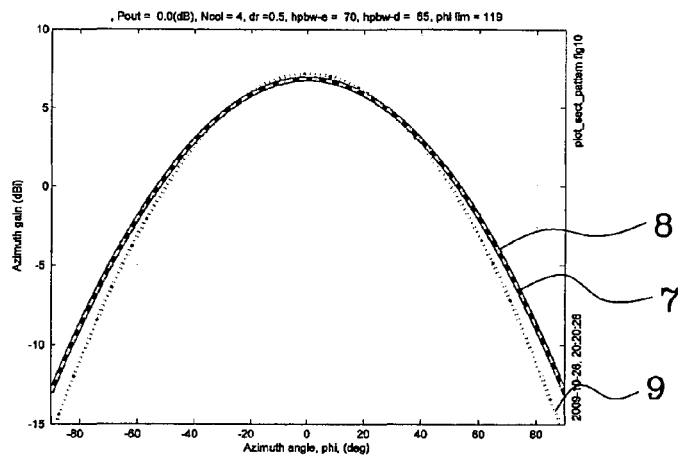
FIG. 7 shows an example of a graph in which the shape of the element pattern and the desired pattern are more or less identical.

The corresponding beam pattern is shown in FIG. 7 and the power utilization (assuming transmission over both beams) becomes:

$\eta_{PA}$=1.00, which corresponds to 0 dB, i.e., the entire power resource can be utilized if desired.

FIG. 7 shows the beam patterns of the above example for beam port 1, left, and port 2, right, for novel method. The black curve 7 indicates power patterns. The hpbw is set to 65 deg for both the element line 8 and the desired sector covering beam line 9.

Figure 8:
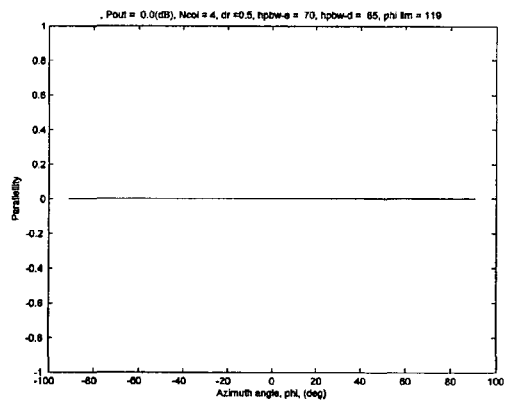
FIG. 8 shows the corresponding a graph illustrating polarization parallelity of the antenna generating the power pattern in FIG. 7.

The polarization parallelity is shown in FIG. 8 as a function of azimuth angle. The figure shows that the polarizations between the two beams are orthogonal for each value of the angle even though the polarizations change with angle.

In fact there are several other weight vectors that give similar performance. A second examples is $$W_1^T = \begin{bmatrix} 1 & 0 & 1 & 0 \\ 1 & 0 & -1 & 0 \end{bmatrix} \text{ and } W_2^T = \begin{bmatrix} 0 & 1 & 0 & -1 \\ 0 & 1 & 0 & 1 \end{bmatrix}$$

and a third example is $$W_1^T = \begin{bmatrix} 1 & 1 & 0 & 0 \\ 0 & 0 & 1 & -1 \end{bmatrix} \text{ and } W_2^T = \begin{bmatrix} 1 & -1 & 0 & 0 \\ 0 & 0 & 1 & 1 \end{bmatrix}$$

The weight matrixes can of course be subject to polarization rotation as described above.

Also spatial beam steering can be applied, identical for both matrixes (beams) with maintained performance according to $$W_{spatial} = \Psi W$$

where $\Psi$ is a spatial beam steering matrix, here shown for 4 columns assuming that the phase centre separation between the elements is identical, such as a linear phase shift over the array $$\Psi = \begin{bmatrix} e^{-j1.5\delta} & 0 & 0 & 0 \\ 0 & e^{-j0.5\delta} & 0 & 0 \\ 0 & 0 & e^{j0.5\delta} & 0 \\ 0 & 0 & 0 & e^{j1.5\delta} \end{bmatrix}$$

$\delta$ is an electrical phase angle, which (in combination with element separation in wavelengths) defines the scan angle of the beam(s).

An additional effect for the simplified cases is that the weight matrix becomes independent of the element separation, i.e., the same weight matrix can be used for different antennas for which the element spacing is different.

In the examples above, the term "array element" have been used in the meaning of "beam port" to which there exists an associated beam with certain properties, such as phase centres (one for each polarization). A phase centre is defined as: "The location of a point associated with an antenna such that, if it is taken as the centre of a sphere whose radius extends into the farfield, the phase of a given field component over the surface of the radiation sphere is essentially constant, at least over that portion of the surface where the radiation is significant", see IEEE Standard Definitions of Terms For Antennas, IEEE Std 145-1993 (ISBN 1-55937-317-2).

The invention claimed is:

1. A method of generating two beams, having orthogonal polarizations, covering a selected area using an antenna comprising at least three dual-polarized array elements, each dual-polarized array element having a first phase centre associated with a first polarization and a second phase centre associated with a second polarization, orthogonal to said first polarization, the first and second phase centres of said dual-polarized array elements arranged in a first direction and symmetrically distributed across a two dimensional antenna surface in relation to a symmetry line, perpendicular to said first direction, each beam generated by feeding said dual-polarized array elements, said method comprising:

designing a first weight matrix having a first non-zero weight vector for the first polarization and a second non-zero weight vector for the second polarization;
applying the first weight matrix to said dual-polarized array elements to generate a first beam covering the selected area;
calculating a second weight matrix based on the weight vectors of the first weight matrix; and
applying the second weight matrix to said dual-polarized array elements to generate a second beam covering the selected area.

2. The method according to claim 1, wherein said step of calculating the elements in the second weight matrix comprises calculating elements in the second weight matrix by:
mirroring each element of the first weight vector in a real axis and mirroring each element of the second weight vector in an imaginary axis;
row reversing the calculated elements; and
column reversing the calculated row reversed elements.

3. The method according to claim 1, wherein the first weight matrix $W_1^T$ is defined as:

$$W_1^T = \begin{bmatrix} W_{1A}^T \\ W_{1B}^T \end{bmatrix} = \begin{bmatrix} w_{11}^A & w_{12}^A & \ldots & w_{1N}^A \\ w_{11}^B & w_{12}^B & \ldots & w_{1N}^B \end{bmatrix}$$

wherein $W_{1A}^T$ is the first weight vector with elements $w_{1n}^A$; n=1-N, $W_{1B}^T$ is the second weight vector with elements $w_{1n}^B$; n=1-N, A represents the first polarization and B represents the second polarization, and the second weight matrix $W_2^T$ is calculated as:

$$W_2^T = \begin{bmatrix} W_{2A}^T \\ W_{2B}^T \end{bmatrix}$$

$$= conj\left(\begin{bmatrix} -W_{1B}^T \\ W_{1A}^T \end{bmatrix}\right) F$$

$$= conj\left(\begin{bmatrix} -w_{11}^B & -w_{12}^B & \ldots & -w_{1N}^B \\ w_{11}^A & w_{12}^A & \ldots & w_{1N}^A \end{bmatrix}\right) \begin{bmatrix} 0 & 0 & \ldots & 1 \\ \vdots & \vdots & \ddots & \vdots \\ 0 & 1 & \ldots & 0 \\ 1 & 0 & \ldots & 0 \end{bmatrix} =$$

$$= \begin{bmatrix} (-w_{1N}^B)^* & \ldots & (-w_{12}^B)^* & (-w_{11}^B)^* \\ (w_{1N}^A)^* & \ldots & (w_{12}^A)^* & (w_{11}^A)^* \end{bmatrix}$$

$$= \begin{bmatrix} w_{21}^A & w_{22}^A & \ldots & w_{2N}^A \\ w_{21}^B & w_{22}^B & \ldots & w_{2N}^B \end{bmatrix}$$

wherein $W_{2A}^T$ is the first weight vector with elements $w_{2n}^A$; n=1-N, and $W_{2B}^T$ is the second weight vector with elements $w_{2n}^B$; n=1-N.

4. The method according to claim 1, further comprising arranging said first and second phase centres of said dual-polarized array elements on a straight line.

5. The method according to claim 1, further comprising arranging each dual-polarized array element to have a first feeding point associated with the first polarization and a second feeding point associated with the second polarization, whereby each beam is generated by feeding said first and second feeding points.

6. The method according to claim 1, further comprising selecting each dual-polarized array element to have an arbitrary configuration provided the first and second phase centres are arranged in the first direction and symmetrically in relation to the symmetry line.

7. The method according to claim 1, further comprising selecting all dual-polarized array elements to be identical.

8. The method according to claim 7, further comprising dividing each dual-polarized array element into two antenna elements having identical antenna power patterns with orthogonal polarization.

9. The method according to claim 1, further comprising performing polarization rotation of both beams by applying a polarization rotation matrix $\Phi$ to the first and second weight matrices, said polarization rotation matrix defined as:

$$\Phi = \begin{bmatrix} \cos(\beta) & \sin(\beta) \\ -\sin(\beta) & \cos(\beta) \end{bmatrix}$$

wherein $\beta$ is a spatial angle for the rotation of the polarization.

10. The method according to claim 1, wherein a separation between the first phase centres, and a separation between the second phase centres, is identical, said method further comprising performing spatial beam steering for both beams by applying a spatial beam steering matrix $\Psi$ to the first and second weight matrices, wherein said beam steering matrix is designed as a linear phase shift over the antenna defined as:

$$\Psi = \begin{bmatrix} e^{-j1,5\delta} & 0 & 0 & 0 \\ 0 & e^{-j0,5\delta} & 0 & 0 \\ 0 & 0 & e^{j0,5\delta} & 0 \\ 0 & 0 & 0 & e^{j1,5\delta} \end{bmatrix}$$

wherein $\delta$ is an electrical phase angle, which in combination with element separation in wavelengths defines the scan angle of the beams.

11. An antenna configured to generate two beams, having orthogonal polarizations, covering a selected area, said antenna comprising at least three dual-polarized array elements, each dual-polarized array element having a first phase centre associated with a first polarization and a second phase centre associated with a second polarization, orthogonal to said first polarization, the first and second phase centres of said dual-polarized array elements arranged in a first direction and symmetrically distributed across a two dimensional antenna surface in relation to a symmetry line, perpendicular to said first direction, each beam generated by feeding said dual-polarized array elements, said antenna further configured to be controlled by a method as defined in claim 1.

* * * * *

UNITED STATES PATENT AND TRADEMARK OFFICE
CERTIFICATE OF CORRECTION

PATENT NO. : 8,994,588 B2  
APPLICATION NO. : 13/504132  
DATED : March 31, 2015  
INVENTOR(S) : Petersson et al.

It is certified that error appears in the above-identified patent and that said Letters Patent is hereby corrected as shown below:

In the Specification

Column 2, Line 31, delete "DRAWING" and insert -- DRAWINGS --, therefor.

Column 3, Line 17, delete "$11_A$, and" and insert -- $11_A$ and --, therefor.

Signed and Sealed this  
First Day of September, 2015

Michelle K. Lee  
*Director of the United States Patent and Trademark Office*